Figure 1:
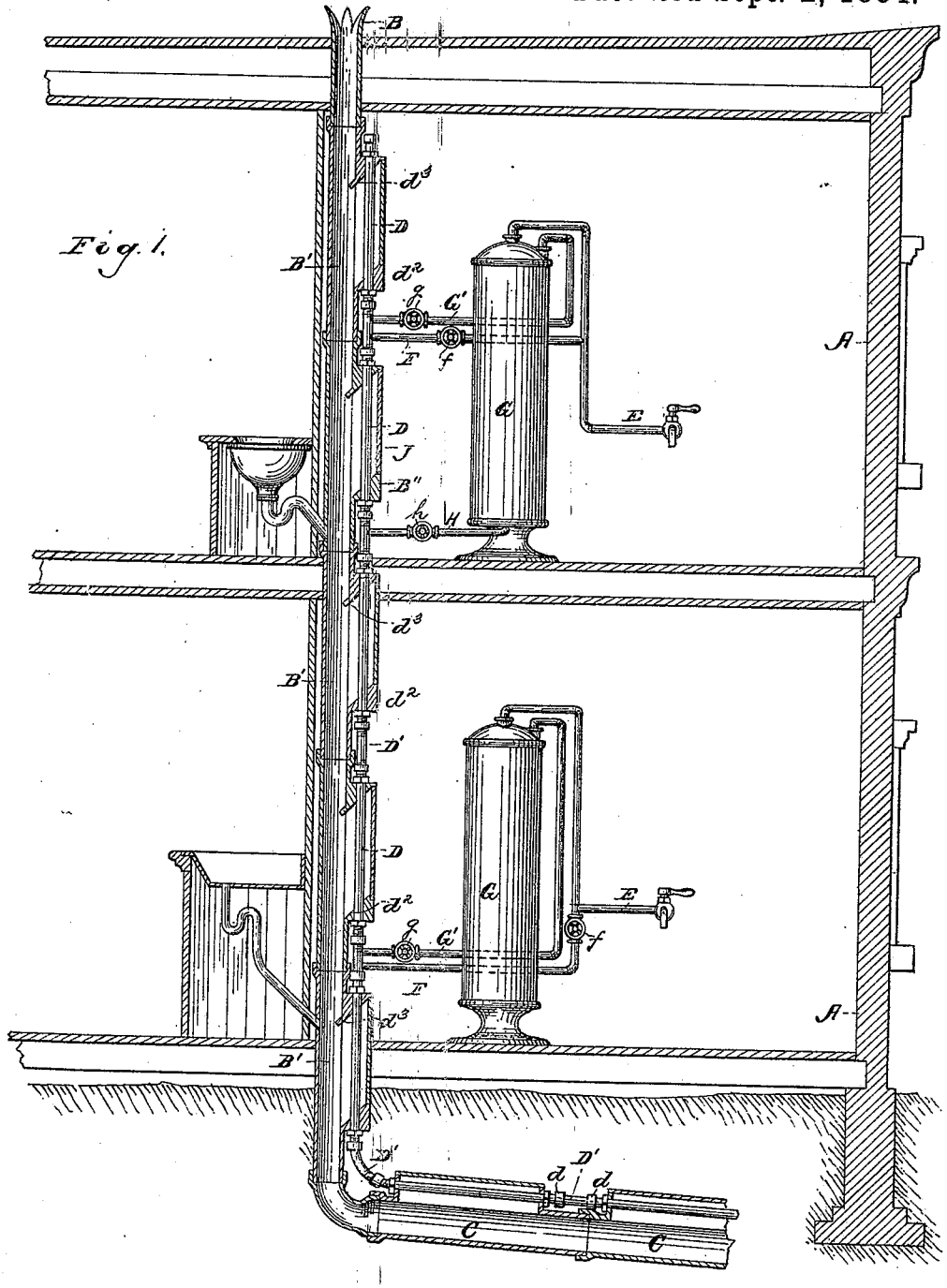

(No Model.) 2 Sheets—Sheet 1.

J. J. WADE.
FITTING FOR DRAINS, SOIL, AND WASTE PIPES.

No. 304,379. Patented Sept. 2, 1884.

Witnesses,
Henry Frankfurter
W. L. Baker

Inventor,
James J. Wade.
per Gridley & Co.
his Attorneys.

(No Model.) 2 Sheets—Sheet 2.
J. J. WADE.
FITTING FOR DRAINS, SOIL, AND WASTE PIPES.
No. 304,379. Patented Sept. 2, 1884.
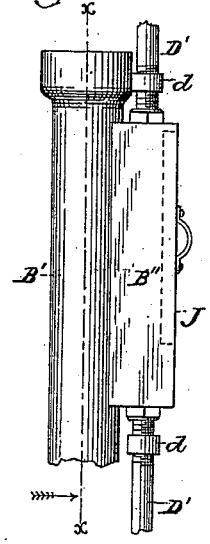
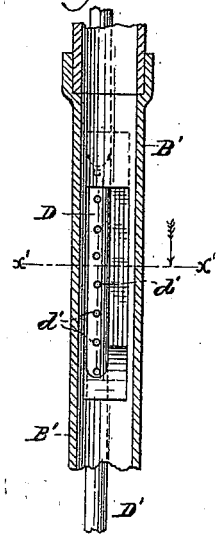
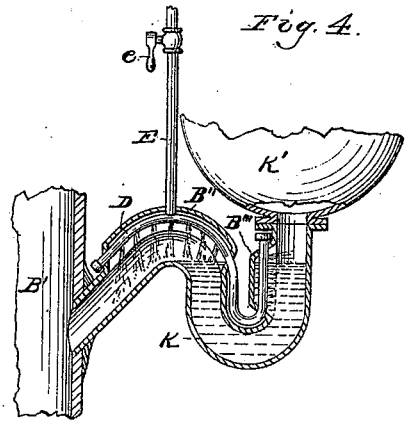
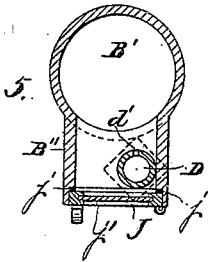
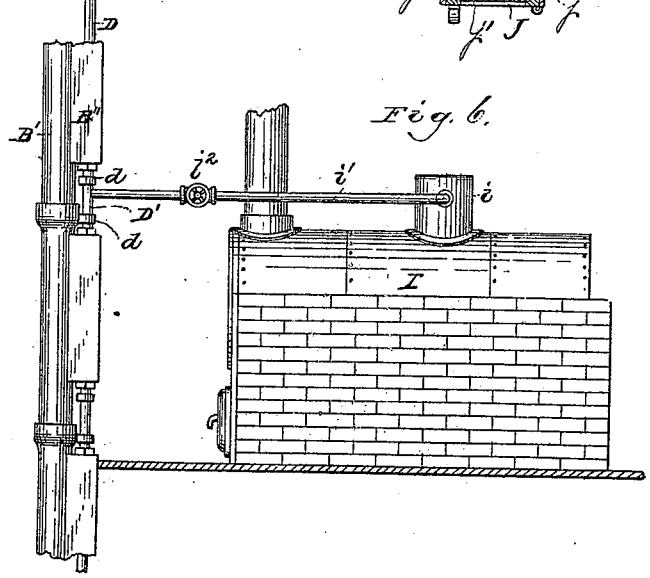
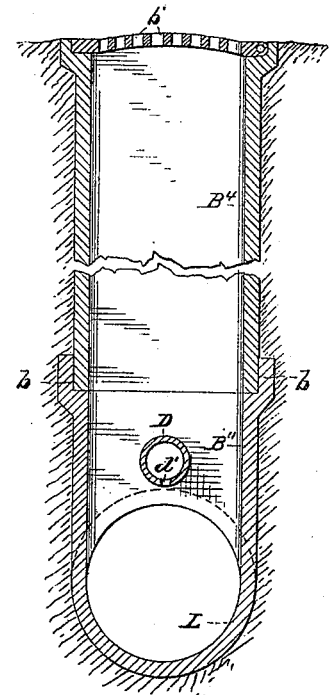
Witnesses.
Inventor.
James J. Wade.
per Gridley & Co
his Attorneys,

UNITED STATES PATENT OFFICE.

JAMES J. WADE, OF CHICAGO, ILLINOIS.

FITTING FOR DRAIN, SOIL, AND WASTE PIPES.

SPECIFICATION forming part of Letters Patent No. 304,379, dated September 2, 1884.

Application filed February 12, 1884. (No model.)

*To all whom it may concern:*

Be it known that I, JAMES J. WADE, of Chicago, in the county of Cook and State of Illinois, have invented a new and useful Improvement in Fittings for Drain, Soil, and Waste Pipes, of which the following is a description, reference being had to the accompanying drawings, in which—

Figure 1 represents a central vertical sectional view of the same as applied to the soil-pipe and drain of an ordinary house and connected with the water-boiler and supply-pipe. Fig. 2 is a side view in detail of one of said fittings as applied to a soil or waste pipe or drain. Fig. 3 is a vertical sectional view of the same on the line $x\ x$, Fig. 2, viewed in the direction of the arrow. Fig. 4 is a vertical central sectional view of a modified form of said fixture as applied to a closet or other trap. Fig. 5 is a transverse sectional view of Fig. 2 on the line $x'\ x'$, Fig. 3, viewed in the direction of the arrow. Fig. 6 is a modification of Fig. 1, showing said fittings connected with a steam-boiler; and Fig. 7 shows a still further modification thereof as applied to larger drains or sewers.

Like letters of reference indicate like parts in the different figures.

No provision has heretofore been made for the systematic and thorough flushing of drain, soil, and waste pipes, or the various traps and junctions connected therewith, nor can satisfactory access thereto be obtained or the condition of the same be known under the old system without greatly disturbing or actually removing the pipe or portions of it, all of which is seriously objectionable not only on account of the attendant expense, but for other equally obvious reasons.

The object of my invention is to provide a "fitting" which may, with slight modification, be applicable to soil and waste pipes, drains, and sewers, as well as closet, urinal, or other traps, whereby the whole or a portion of said pipes, drains, or traps may be thoroughly flushed and cleaned at will by jets of cold or hot water or steam, and whereby a ready and easy access may be had thereto for the purpose of removing obstructions or repairing said pipes or fittings. A further object is to so construct said fitting that the interior of the pipe may be seen and its condition ascertained without opening the same, all of which will be hereinafter more fully described, and definitely pointed out in the claims.

In the drawings, A, Fig. 1, represents a portion of a building in section, through the different stories of which a soil-pipe, B, is extended upward, preferably through the roof, as shown. The bottom of said pipe is connected in any well-known manner with a drain, C, Fig. 1. Said fitting B', as ordinarily applied, consists of a single length or section of lead, iron, or clay pipe, provided with an offset or enlargement, $B^2$, thereon, and preferably cast or molded solidly therewith, said offset or extension being sufficient to enable a pipe, D, to be inserted therein, and to extend from end to end, as shown, the projecting portions being provided with "unions" $d$, by which the same may be secured to a connecting-pipe, D', running from one of said fittings to the next. That portion of the pipe D within the offset $B^2$ is provided with a series of perforations, $d'$ $d'$, as shown in Fig. 3, which should be sufficient in number, and so arranged that jets therefrom will completely flush the pipe and recess, while the pipe D' is connected directly with the cold-water-supply pipes E E, with the hot-water reservoir G by the pipes G' G', or the sediment-pipe H, Fig. 1, may be connected therewith. Cocks $f\ f$, $g\ g$, and $h$, respectively, serve to cut off the flow from said various sources. If desired, in buildings where steam-boilers are used, said pipe D' may be connected directly with the steam-dome $i$ of the boiler I by the pipe $i'$, a suitable cock, $i^2$, Fig. 6, being provided to admit or cut off the flow of steam when desired.

It is obvious that in case of soil or waste pipes or drains the entire system may be made of a series of sections or fittings B, or one or more of the same may be inserted therein at such intervals as may be desired, while the remainder of the pipe may be of the usual kind; but I prefer their use as shown in Fig. 1, it being obvious that a more complete flushing thereof may be obtained.

In order to prevent a lodgment of any solid matter within the offset $B^2$, I prefer to construct the interior of the same with downward-projecting inclines $d^2\ d^3$, the upper one, $d^3$, of which may project outward somewhat within the pipe, thereby forming a flange adapted to deflect the flow of the matter in the pipe and prevent a lodgment of the same within said recess. To gain access to the interior of said fitting in order to repair the same and remove obstructions from the pipe or drain, I provide a door, J, Figs. 2 and 5, which, shutting firmly against packing $jj$, Fig. 5, is sufficiently tight to prevent leakage. A glass panel, $j'$, Fig. 5, may be inserted therein, so that the condition of the interior may be known at any time without opening the same. I prefer to place the pipe at one side of the recess $B^2$, as shown in Figs. 3 and 5, in order that the interior of said pipe may be the more accessible.

It is obvious that by modifying the construction of said fitting the same may be applied to closet or urinal traps. Fig. 4 represents such modified construction. Offsets $B^2$ $B^3$ respectively are formed upon the trap K in the relative positions shown, and the pipe D curved to conform to the shape of the trap inserted therein, and connected with the supply-pipe, a cock, $e$, controlling the flow. In said Fig. 4 the jets of water are represented as issuing from said pipe D into said trap. The bowl $K'$ may be that of a closet or urinal. It is clear that the result would be the same in the other constructions shown.

In case said fitting is applied to sewer-pipes, the extension $B^2$ may be carried farther upward, and provided with a flanged shoulder, $b$, into which sections of ordinary round sewer-pipe $B^4$ may be inserted and carried to the street-surface, or an oblong casting of the length of said offset $B^2$ may be used, which is the preferable construction, as being not only stronger and more durable, but its oblong shape would give more complete access to the sewer-pipe L beneath. A hinged iron door, $b'$, serves to cover said opening and to give access thereto, while the same may be perforated to ventilate said pipe.

I do not confine my invention to drains and waste-pipes, as the same is applicable to main-sewers, but to be efficient therein should be supplied with a correspondingly large water-pipe.

Much difficulty is experienced from obstructions forming in drain and sewer pipe junctions, in which case it is necessary to excavate and remove the same, in order to remove said obstruction. Said fitting may be applied equally well to a Y or T junction as to a straight pipe, in which event an obstruction therein may be removed without disturbing said junction.

Having thus described my invention, what I claim, and desire to secure by Letters Patent, is—

1. A fitting for waste, drain, soil, or sewer pipes or traps, consisting of the pipe B, composed of detachable sections having offsets, into which is inserted a perforated pipe to be connected with a steam or water service pipe, whereby the pipe or drain in which said fitting is inserted may be flushed, substantially as and for the purpose set forth.

2. A fitting for waste, drain, soil, or sewer pipes or traps, consisting of the pipe B, composed of detachable sections having offsets, into which is inserted a perforated pipe provided with unions thereon for connection with a steam or water service pipe, substantially as and for the purpose set forth.

3. A fitting for waste, drain, soil, or sewer pipes or traps, consisting of the pipe B, composed of detachable sections having offsets, into which is inserted a perforated pipe provided with unions thereon for connection with a steam or water service pipe, and a door in said offset, whereby access may be had to the interior of said pipe, substantially as and for the purposes set forth.

4. A fitting for waste, drain, soil, or sewer pipes or traps, consisting of the pipe B, composed of detachable sections having offsets, into which is inserted a perforated pipe provided with unions thereon for connection with a steam or water service pipe, and a glass paneled door in said offset, whereby access may be had to the interior of said pipe, substantially as and for the purposes set forth.

JAMES J. WADE.

Witnesses:
D. H. FLETCHER,
HENRY FRANKFURTER.